Jan. 2, 1968 W. R. JOHNSON ET AL 3,361,873

DISC RECORDING SYSTEM

Filed May 7, 1962 3 Sheets-Sheet 1

INVENTORS
Wayne R. Johnson
Dean L. DeMoss
By Smyth, Roston & Pavitt
Attorneys

INVENTORS
Wayne R. Johnson
Dean L. DeMoss
By Smyth, Roston & Pavitt
Attorneys

Jan. 2, 1968 W. R. JOHNSON ET AL 3,361,873

DISC RECORDING SYSTEM

Filed May 7, 1962 3 Sheets-Sheet 3

INVENTORS
Wayne R. Johnson
Dean L. DeMoss

By Smyth, Roston & Pavitt

Attorneys 3,361,873
Patented Jan. 2, 1968

3,361,873

DISC RECORDING SYSTEM

Wayne R. Johnson, Los Angeles, and Dean L. De Moss, Glendale, Calif., assignors to Minnesota Mining and Manufacturing Company, St. Paul, Minn., a corporation of Delaware Filed May 7, 1962, Ser. No. 192,930
17 Claims. (Cl. 178—6.7)

Figure 1:
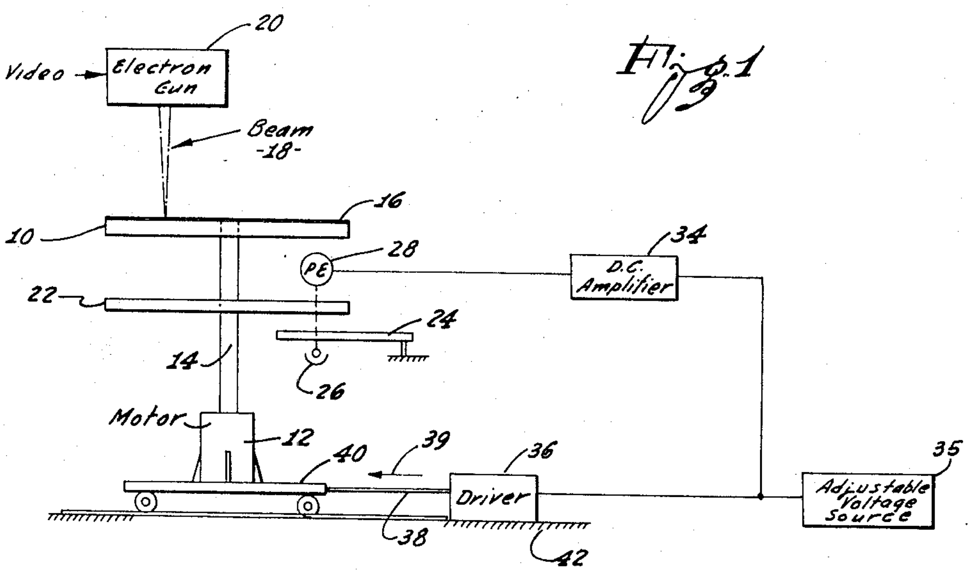

This invention relates to a system for recording information such as video and audio information on a storage medium such as a disc.

In recent years systems have been devised which record high frequency information on a storage medium and provide a subsequent reproduction of the information from the storage medium. For example, signals representing an image being viewed and the sound emanating from the environment of the image have been recorded on a magnetic tape. Also, signals have been recorded on storage media to represent different scientific and mathematical information including the readings of instruments and the values obtained from computations performed by digital computers.

For the recording of high frequency information the systems now in use generally employ magnetic tapes as the storage medium. These tapes have proved fairly successful in recording signals representative of information and in obtaining the reproduction of the information. However, the magnetic structure of the tape limits the fidelity of the recording and reproduction so that the magnetic tapes have to be manufactured with considerable precision. The information recorded on the magnetic tapes also has a limited density of information so that a relatively great amount of tape is required to store information such as that required for a television program having a duration of one-half an hour or an hour. The limited density of information packing on the tape has resulted from limitations in the speed of response of the magnetic transducer heads which are disposed in contiguous relationship to the tape.

In the systems now in use, the transducing head is generally disposed adjacent to the tape to record information in magnetic form on the tape and to reproduce the magnetic information as electrical signals from the tape. The adjacent relationship between the transducing head and the tape occasionally causes the tape to rub against the head so that magnetic particles become removed from the tape and are deposited on the head to affect the operation of the head. The magnetic particles on the tape tend to produce an abrasive action on the head, thereby permanently affecting the response characteristics of the head.

It is also difficult to use a magnetic tape as a master for the reproduction of a large quantity of identical tapes because of the wear on the tape and the adjacent heads and because of the considerable length of tape required for the master. It would, therefore, be more desirable to use discs as the master since they tend to store information in a more compact form than tapes. However, the disc systems of the prior art have generally involved a groove cut in a disc of plastic material with variation in the walls of the groove representing the electrical information.

The disc systems of the prior art have had certain important deficiencies. For example, the reproducing means has generally been in contiguous relationship with the disc. Actually, the reproducing means has constituted a needle which has contacted a groove in the disc to reproduce the information on the disc. This contact between the needle and the groove has tended to wear the disc after the disc has been used several times.

This invention provides a system which uses a disc as the storage medium and which is responsive to incoming information so as to vary the light transmission characteristics of the disc in accordance with such information and to obtain a recording of the information on the disc. For example, the light transmission characteristics of the disc are varied in a spiral track during the recording operation by an electron beam whose characteristics are controlled by signals representative of the incoming information. By means of illustration, the intensity of the electron beam may be varied by adjusting the potential on the grid of an electron gun in accordance with the characteristics of the information to be recorded. Since the electron beam is projected toward the disc from a position removed from the disc, no frictional forces are produced on the disc by the transducing action.

This invention provides means for recording information on the disc in a spiral track having a constant pitch. A driving means is provided to move the disc along a radial line extending from the center of rotation of the disc. As the disc is moved along the radial line, the disc is also rotated at a constant speed past an electron beam which is maintained at a substantially constant position. The combination of the movement and rotation of the disc past the stationary electron beam produces an spiral track on the disc.

The driving means includes a coarse control of the radial movement of the disc relative to the beam so that the information becomes recorded on the beam at a substantially constant rate. A fine control is also provided which corrects for instantaneous variations in the radial movement of the disc. This is accomplished by deflecting the electron beam in accordance with instantaneous changes in the speed at which the disc is moved radially.

Another important feature of the system constituting this invention is the inclusion of circuitry to compensate for eccentricities or off-center rotations of the disc. Detecting means are provided at a pair of points spaced by an angle of substantially 90° from each other around the periphery of the disc to determine eccentricities in the rotation of the disc. Signals representative of the eccentricities in the rotation of the disc are developed and supplied to control means to deflect the electron beam in accordance with eccentricities in the rotation of the disc. The signals produced by one of the detecting means control the deflection of the beam in a direction corresponding to the radial movement of the beam so that information becomes recorded on the disc in a spiral track having a substantially constant pitch. The signals produced by the other detecting means control the deflection of the beam in a direction along the spiral configuration of the track to insure that the information becomes recorded at a substantially constant rate along the track.

Reproduction of the signals from the disc is accomplished by directing a light beam at the disc and by modifying the light beam in accordance with the light transmission characteristics previously provided at successive positions on the spiral track on the disc. The modified light beam is detected to obtain a recovery of the information previously recorded on the disc. The information on the disc can be reproduced without having any members directly engage the disc. In this way, no wear is produced on the disc during the reproduction of the information on the disc. The reproducing system has been disclosed and claimed in co-pending application Serial No. 181,392 filed on March 21, 1962, by Wayne R. Johnson and assigned of record to the assignee of this application and is not considered to be part of this invention.

Figures 2, 3:
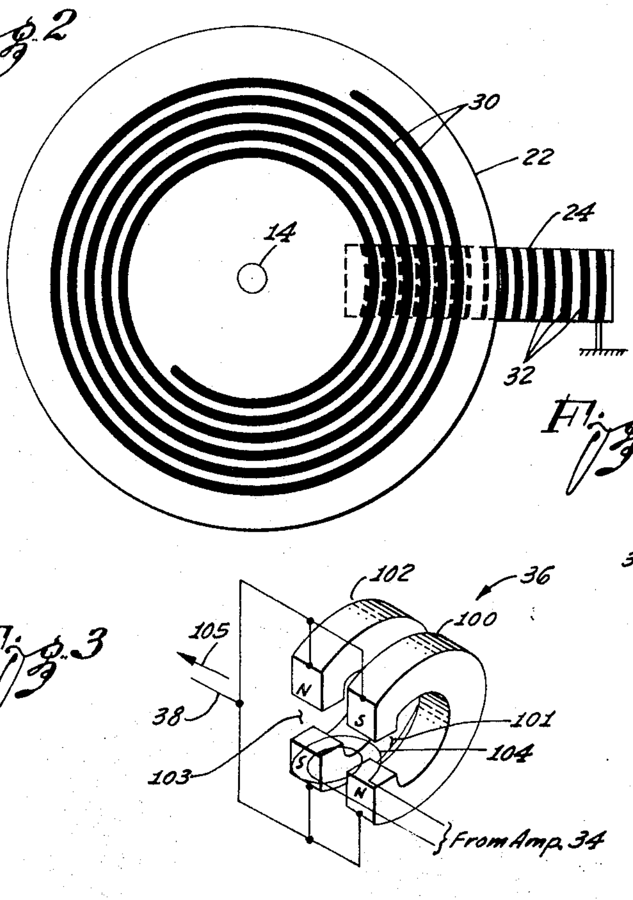
Figure 2A:
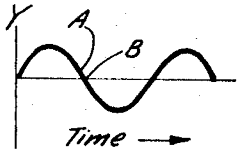
Figure 3A:
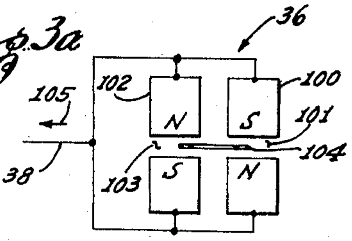
Figure 4:
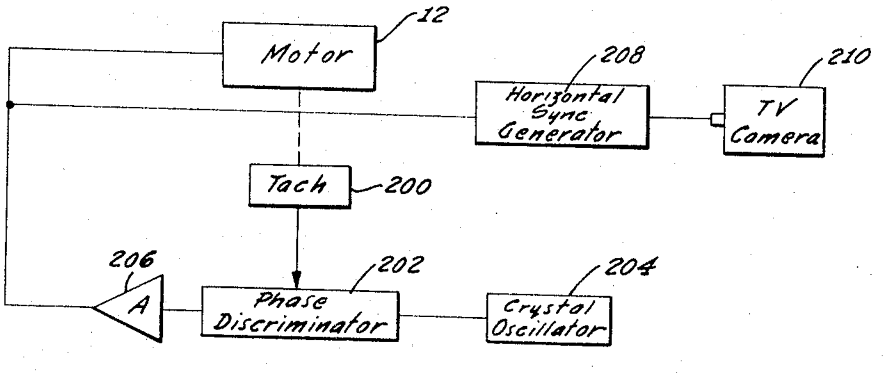
Figure 5:
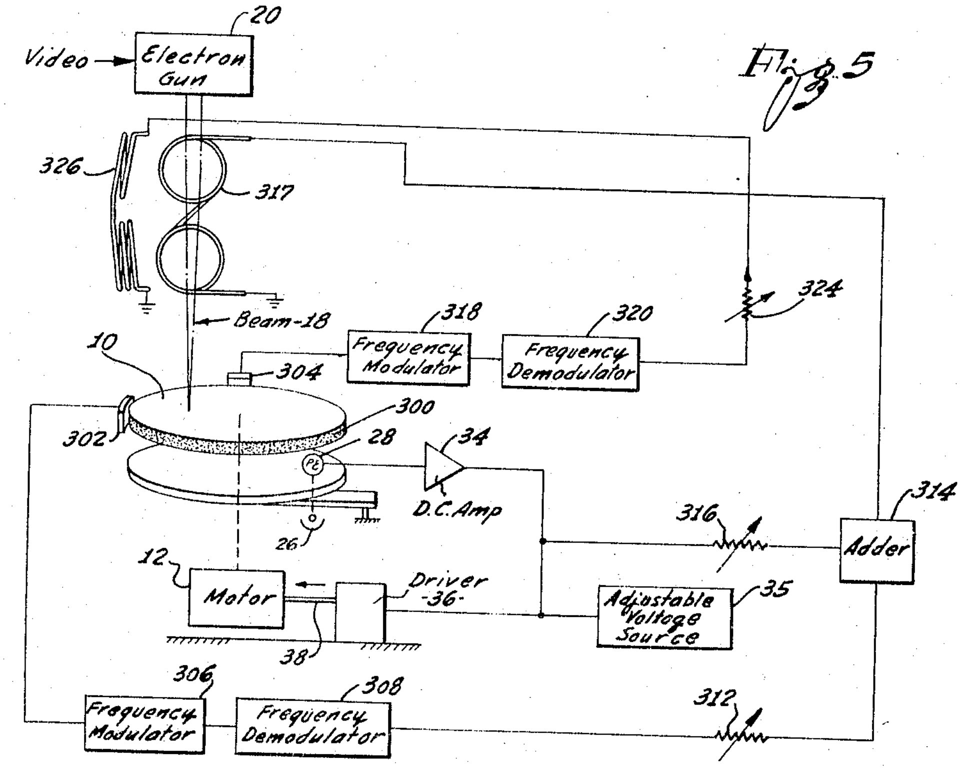
Figure 6:
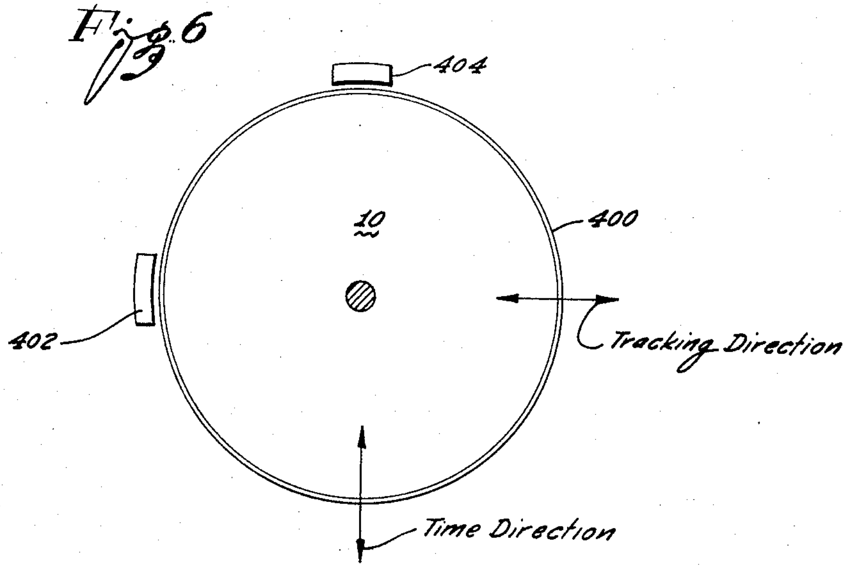
Figure 7:
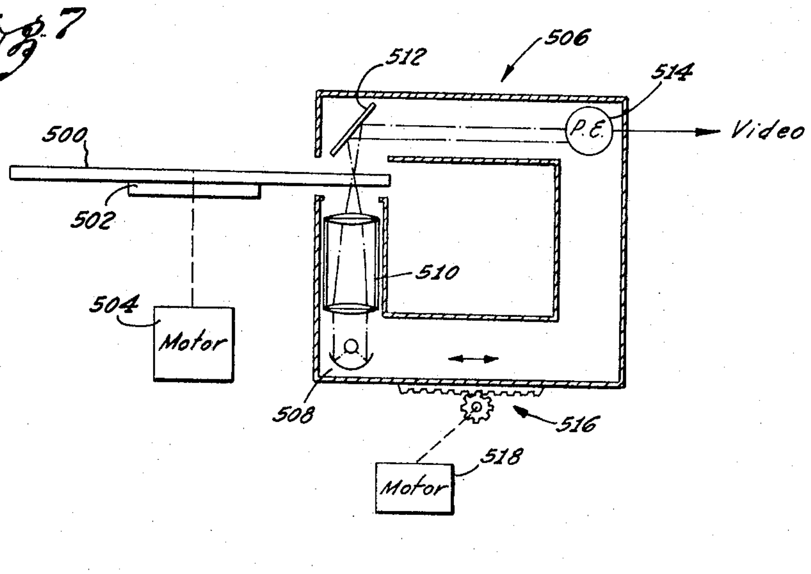

In the drawings:

FIGURE 1 somewhat schematically illustrates a system for moving a disc radially and for rotating the disc past recording means to obtain a recording of information in a spiral track on the disc, the mechanical details of the system being shown in side elevation and the electrical stages being shown in block form;

FIGURE 2 is an enlarged top plan view of certain components including in the system shown in FIGURE 1 for producing a driving signal to obtain the movements of the disc along a radial line;

FIGURE 2$a$ is a curve of the driving signal which would be produced during the rotation of the disc if the disc were not moved along the radial line;

FIGURE 3 is a somewhat schematic perspective view of one embodiment of a driver which may be included in the system shown in FIGURE 1 to drive the disc in the radial direction;

FIGURE 3$a$ is a side elevational view of the driver illustrated in FIGURE 3;

FIGURE 4 is a block diagram of an electrical system for controlling the operation of the motor which rotates the disc and for controlling the recording of the information on the disc;

FIGURE 5 somewhat schematically illustrates a system for compensating for eccentricities in the rotation of the disc, the electrical stages being shown in block form and the mechanical components being shown partly in side elevation and partly in perspective;

FIGURE 6 shows an alternative magnetic means which can be used in the system shown in FIGURE 5 to produce signals for compensating for any eccentricities in the rotation of the disc; and FIGURE 7 is a somewhat schematic side elevational view of a system (not forming a part of this invention) for reproducing information previously recorded on the disc.

In the recording system of FIGURE 1, a disc 10 is driven by a motor 12 to rotate at a substantially constant speed. The motor 12 is coupled to the disc 10 through a shaft 14. The disc 10 may be made of glass or quartz or any other suitable material. The disc 10 has on its surface a photographic coating 16 which is responsive to charged particles directed at the coating 16 in the form of a beam 18. This beam 18 of charged particles is obtained from an electron gun generally indicated at 20. The intensity of the beam 18 of charged particles may be controlled by adjusting the potential on the grid (not shown) of the electron gun 20 in accordance with the characteristics of the information to be recorded. This may be accomplished for television by the application of video signals to the electron gun 20. The construction of the electron gun is described in full detail in copending application Serial No. 181,393 filed on March 21, 1962, by David Paul Gregg and assigned of record to the assignee of record in this application.

Also mounted on the shaft 14 is an additional disc 22 which rotates at the same speed as the disc 10. Adjacent to the disc 22 is a segment 24 of a disc which is maintained stationary with respect to the disc 22. A source 26 directs light through the segment 24 and the disc 22 to a photoelectric cell 28.

On the surface of the disc 22 is a spiral 30 (FIGURE 2) which is opaque to light energy. The segment 24 contains a similar spiral 32 which is discontinuous since the segment 24 is only a portion of a disc. The pitch of the spirals 30 and 32 are identical but the radial length of one of the spirals is approximately twice as great as the radial length of the other spiral. Preferably the radial length of the segment 24 is twice as great as the radial length of the disc 22. It will be appreciated that the lines 32 on the segment 24 may be straight since the light source 26 may be focused at a central point on the segment 24.

As the disc 22 rotates, the light passing through the segment 24 and the disc 22 is modulated in each cycle of rotation in accordance with relative changes in the instantaneous disposition of the spiral 30 on the disc 22 and the spiral 32 on the segment 24. The photocell 28 detects the modulated light energy and produces a signal which is applied to an amplifier. An additional adjustable voltage source 35 is also coupled at the output of the amplifier 34. The combination of the signals from the amplifier 34 and the voltage source 35 control the operation of a driver 36 which is responsive to a direct signal. A shaft 38 is attached at one end to the driver 36 and at the other end to a base 40 which is illustrated schematically in FIGURE 1 as being rollable along a support surface 42 in a direction indicated by an arrow 39. The motor 12 is positioned permanently on the base 40 to follow the movement of the base 40. Because of this, the entire mechanism consisting of the motor 12, the shaft 14 and the disc 10 moves in accordance with the movement of the base 40.

FIGURE 2$a$ shows the characteristics of the output signal which would be produced by the amplifier 34 at progressive instants of time if the base 40 were not moved in the direction indicated by the arrow 39. Actually, however, a direct voltage is produced by the amplifier 34 because of the movement of the base 40 by the driver 36 in the direction indicated by the arrow 39. If the driving system had an instantaneous response, the average value of the direct signal from the amplifier 34 would be substantially zero. However, since there is a time lag in the circuitry and the associated mechanical components, and since there is an inherent amount of friction in the mechanical components, the signal from the amplifier 34 stabilizes at a point A shown on the curve illustrated in FIGURE 2$a$. The voltage source 35 is adjusted to produce an output signal to compensate for the losses in the system and have the system stabilize at a zero point B shown on the curve illustrated in FIGURE 2$a$. The system therefore tracks on a linear portion of the curve surrounding the point B illustrated in FIGURE 2$a$ to compensate for errors in rotational and radial movement of the disc 10.

The driver 36 can be of a type shown in FIGURE 3 or any other suitable types. In the embodiment shown in FIGURE 3, two circular-shaped magnets 100 and 102 are disposed ajacent to each other with the north pole magnet 100 adjacent to the south pole of magnet 102 and the south pole of magnet 100 adjacent to the north pole of magnet 102. The magnets 100 and 102 are respectively provided with gaps 101 and 103. A flat coil of wire 104 is within the gaps formed between the north and south poles of the magnets 100 and 102. The coil 104 is disposed in a plane substantially perpendicular to the plane defined by each of the magnets 100 and 102. As a signal is applied to the coil 104 from the amplifier 34, the interaction between the magnetic field produced in one direction by the current passing through the coil 104 and the magnetic fields produced in a substantially perpendicular direction by the magnets 100 and 102 provides a motion of the magnets relative to the coil 104. As indicated by an arrow 105 in FIGURE 3, this motion of the magnets is in a direction corresponding to the plane defined by the coil 104 and perpendicular to the planes defined by the magnets 100 and 102. Although the magnets 100 and 102 have opposite polarities, the motion imparted to the magnet 100 by the coil 104 is in the same direction as the motion imparted to the magnet 102 by the coil since the current flowing through the coil 104 in the gap 101 is opposite in direction to the current flowing through the coil in the gap 103. The motion of the magnets is imparted to the base 40 through the shaft 38. It will be appreciated that the driver may also be constructed to have the magnets stationary with the motion imparted to the shaft 38 by movement of the coil 104.

Since the electron gun 20 is fixed in position, the beam 18 produced by the electron gun 20 strikes the disc 10 at a substantially constant position. This may be at a point along the same radial line at which the disc 10 moves. The intensity of the beam at each instant is dependent upon the characteristics of the signal information introduced to the electron gun 20 at that instant, this signal information illustratively representing video and audio information or the readings of instruments or mathematical calculations. As the disc 10 rotates and moves along the radial line, a spiral track of information is accordingly produced in photographic form on the coating 16 of the disc 10.

FIGURE 4 shows a system for controlling the motor 12 to obtain a rotation of the motor at a constant speed. A tachometer 200 is mechanically coupled to the motor 12 to develop an electrical signal having a frequency in accordance with the speed of rotation of the motor 12. The signal from the tachometer 200 is applied to a phase discriminator 202 which also receives a constant frequency signal from a crystal oscillator 204. The phase discriminator 202 detects any difference in phase between the signals supplied by the tachometer 200 and by the crystal oscillator 204 to produce a control signal having a polarity and an intensity dependent upon any difference in phase. The control signal from the phase discriminator 202 passes through an amplifier 206 to the motor 12 to control the speed of the motor.

Another feature of the system of FIGURE 4 is the frequency control of a horizontal sync generator in accordance with the speed of the motor. This insures that the information supplied to the electron gun 20 is at the same rate at which the motor is rotating. The horizontal sync generator 208 is connected to the amplifier 206 to produce signals at a variable frequency related to the controlled speed of the motor 12. The horizontal sync generator 208 is connected to the television camera 210 to control the rate at which the information detected by the television camera is applied to the electron gun illustrated in FIGURE 1. For example, if the motor is driven at a rate of 30 cycles per second, the horizontal sync generator generates a sync signal of 15,750 cycles per second. This is the normal sync signal in a television system to produce a frame rate of 30 cycles per second when there are 525 lines in the television picture. Therefore, all of the information recorded on the spiral track of the disc 10 along a radial line extending from the center of the disc represents the same position on the television screen in successive frames when the information on the disc is reproduced. Each complete revolution of the disc 10 causes a successive frame to be recorded or reproduced and each adjacent radial position on the disc represents the same position on a picture in the successive frames.

Since there is usually very little difference between successive frames of a television picture, the difference between the level of the information on adjacent radial points of the spiral track would usually be small. This is desirable since it minimizes cross-talk between information at successive radial positions on the disc. Since the horizontal sync signal is keyed to the rotational speed of the motor 12, variations in the speed of the motor do not affect the minimum cross-talk positioning on the disc at the same position on successive frames of the picture.

FIGURE 5 shows circuitry for obtaining instantaneous corrections in eccentricity or off-center rotation of the disc 10 and an instantaneous correction for deviations in the speed of the movement of the disc along the radial line. The disc 10 is provided with an outer coating of metal 300 around its peripheral edge. The coating of metal 300 serves as a common plate for two capacitors. The other plates are provided by elements 302 and 304 which are angularly displaced from each other by 90° around the periphery of the disc 10.

As the disc rotates, any eccentricity in the rotation varies the capacitance of the capacitor formed by the plate 302 and the coating 300 and the capacitor formed by the plate 304 and the coating 300. The capacitance formed between the plate 302 and the coating 300 is included in a frequnecy modulator 306 to control the modulator by varying the frequency of the output signal of the frequency modulator 306 in accordance with variations in the value of the capacitance. Since the value of the capacitance varies at a frequency related to the speed at which the disc 10 is rotated, the signals produced by the modulator 306 are modulated at a frequency corresponding to the speed of rotation of the disc 10. The frequency modulator 306 is connected to a frequency demodulator 308 to demodulate the frequency modulated signal. This causes the control signal from the frequency demodulator 308 to have an instantaneous amplitude in accordance with any eccentricity in the disc 10 at each instant of time along the radial line extending from the center of the disc 10 to the plate 302 and to have a frequency related to the speed of rotation of the disc 10. The control signal from the frequency demodulator 308 is therefore in synchronism with the rotation of the disc 10.

The control signal passes through an adjustable attenuator 312 and is applied to an adder 314. There may also be an additional error along this radial line due to variations in the speed at which the driver 36 moves the disc 10. This deviation is detected by the photocell 28 and amplified by the stage 34 in a manner similar to that explained above in reference to FIGURES 1 and 2. The signal from the amplifier 34 is applied to an attenuator 316. The attenuators 312 and 316 are initially adjusted to provide a proper positioning of the beam and to compensate for any fixed errors in the system. The signals are then introduced to an adder 314 and applied by the adder to coils 317 which are disposed to produce deviations in the electron beam from the gun 20 in a direction corresponding to the radial direction of the disc 10. The signal supplied from the adder 314 to the coils 317 provides indication of any deviation in the movement of the base 40 in the radial direction of the disc 10. By causing the coils 317 to shift the beam on an instantaneous basis in the radial direction, any deviations in the movement of the base 40 at a constant rate is compensated so that the beam is recorded on the disc 10 in a spiral path having a substantially constant pitch.

The disc 10 is also corrected for eccentricities in rotation in a direction substantially perpendicular to the radial line upon which the beam 18 is directed. This is accomplished by placing the plate 304 substantially 90° from the plate 302 so that the value of capacitance between the plate 304 and the coating 300 varies with eccentricities in rotation in the direction from the center of the disc 10 to the plate 304. Since the capacitance 304 is included within a frequency modulator 318, variations in the value of the capacitance produce corresponding variations in the frequency of a signal from the modulator 318. The signal is demodulated by a frequency demodulator 320 to produce a control signal in accordance with the magnitude of the eccentricity. The frequency demodulator 320 operates in a manner similar to that described above for the demodulator 308. The control signal from the demodulator 320 is applied to an adjustable attenuator 324 which is initially adjusted to provide a proper positioning of the beam and to compensate for any fixed errors which may be present in the system. The signal then passes to a deflection coil 326 which is at right angles to the deflection coil 317 to provide an instantaneous correction in the position of the beam 18 as it strikes the disc 10. This direction is along the spiral track on the disc 10. By instantaneously varying the position at which the beam is directed to the spiral track, the information becomes recorded at a substantially constant rate on the track in spite of any eccentricities in the rotation of the disc 10. This correction insures that all the information along any given radial line represents information to be reproduced at the same position on a television screen in successive frames. As discussed above, this is desirable since it may reduce the problem of cross-talk.

It will be appreciated that other methods of determining eccentricities in the rotation of the disc 10 may be used. For example, FIGURE 6 shows the use of magnetic means to determine off-center rotation. The disc 10 has an outer coating 400 of magnetic material. Permanent magnets 402 and 404 are displaced by substantially 90° from each other around the annular periphery of the disc 10. Eccentricities in rotation of the disc vary the air gap between the permanent magnets and the magnetic material. This produces variable reluctance paths which can be used to produce signals representative of the eccentricity in rotation. The signal produced between the magnet 402 and the magnetic coating 400 corresponds to the signal produced between the capacitive plate 302 and the coating 300. In like manner, the signal produced between the magnet 404 and the magnetic coating 400 corresponds to the signal produced between the capacitive plate 304 and the coating 300.

FIGURE 7 shows a schematic representation of a system for reproducing information on the disc. This system is disclosed in full detail and is claimed in copending application Serial No. 181,392 filed by Wayne R. Johnson on March 21, 1962, for a Disc Tracking System and assigned of record to the assignee of record in this application. Either the disc 10 can be used directly or a transfer of the information on the disc 10 may be made to a relatively thin disc 500 shown in FIGURE 7. The disc 500 rests on a turntable 502 and is rotated by a motor 504 at a constant speed. An arm 506 is shown to contain the various means for reproducing the information on the disc 500.

A source 508 directs a beam of light through a lens system 510 which focuses the light at the surface of the disc 500. The light passing through the disc 500 is modulated in accordance with the variable characteristics on the surface of the disc 500. A mirror 512 directs the modulated light energy to a photocell 514 which produces an electrical output in accordance with the modulations of the light energy. The signal then passes as a video signal to the normal television reproduction equipment.

The arm 506 is moved by a rack and pinion arrangement 516 along a radial line extending from the center of rotation of the disc 500. A motor 518 drives the rack and pinion 516. It will be appreciated that other means may be used to drive the arm such as a lead screw arrangement or a driving arrangement as shown in FIGURES 1 through 3. As described in detail in copending application Ser. No. 181,392, means may also be included for insuring that the information becomes reproduced from the disc at the same rate and with the same accuracy as the information is recorded on the disc.

It will be apparent to those skilled in the art that other modifications and adaptations may be made of the apparatus shown in the specification and the invention is, therefore, to be limited only by the appended claims.

What is claimed is:

1. In combination in a system to produce variable characteristics representing information in a spiral track on a medium capable of varying its characteristics when subjected to a beam of energy, means operatively coupled to the medium for providing a rotational movement of the medium about the center of the medium, recording means disposed in spaced relationship to the medium for directing a beam of energy toward the medium to produce variations in the characteristics of the medium in accordance with variations in the characteristics of the beam, means operatively coupled to the last mentioned means for providing variations in the characteristics of the beam in representation of information to be recorded on the medium, means operatively coupled to the medium for providing a movement of the medium relative to the beam of energy along a line having a radial component extending from the center of rotation of the medium to produce a spiral track of information on the medium, means operatively coupled to the medium for producing a control signal having characteristics variable in accordance with eccentricities in the rotation of the medium about the center of the medium, and means operatively coupled to the recording means and the control signal for varying the position of the beam of energy in accordance with variations in the characteristics of the control signal to compensate for any eccentricities in the rotation of the medium.

2. In combination in a system to produce variable characteristics representing information in a spiral track on an annular medium capable of varying its characteristics when subjected to a beam of energy, means operatively coupled to the annular medium for providing a rotational movement of the annular medium about the center of the annular medium, recording means disposed in spaced relationship to the medium for directing a beam of energy toward the medium to produce variations in the characteristics of the medium in accordance with variations in the characteristics of the beam, means operatively coupled to the last mentioned means for providing variations in the characteristics of the beam in representation of information to be recorded on the medium, means operatively coupled to the medium for providing a movement of the medium relative to the beam of energy along a line having a radial component extending from the center of rotation of the annular medium to produce a spiral track of information on the medium, means operatively coupled to the annular medium for producing a control signal having characteristics variable in accordance with eccentricities in the rotation of the annular medium about the center of the medium, and means operatively coupled to the recording means and the control signal means for varying the position of the beam along a line having a radial component extending from the center of rotation of the annular medium in accordance with variations in the characteristics of the control signal to compensate for any eccentricities in the rotation of the medium.

3. The combination of claim 2 wherein the annular medium includes a coating on its periphery and the means for producing the control signal includes a member in proximity to the coating on the periphery of the annular medium to provide a variable coupling between the member and the coating in accordance with the spacing between the member and the coating and wherein the control signal means is responsive to the variable coupling between the member and the coating to produce corresponding variations in the characteristics of the control signal.

4. The combination of claim 3 wherein the coating on the periphery of the annular medium and the member in proximity to the coating are conductive to define a capacitance having a value variable in accordance with the spacing between the conductive coating and the conductive member and wherein the control signal is provided with characteristics variable in accordance with variations in the value of the capacitance.

5. The combination of claim 3 wherein the coating on the periphery of the annular medium is magnetic and wherein the member in proximity to the magnetic coating is magnetic to define between the magnetic coating and the magnetic member a path having a reluctance variable in accordance with the spacing between the magnetic coating and the magnetic member and wherein the control signal is provided with characteristics variable in accordance with variations in the reluctance.

6. In combination in a system to provide variable characteristics representing information in a spiral track on an annular medium capable of varying its characteristics when subjected to a beam of energy.

means operatively coupled to the medium for providing a rotational movement of the annular medium about the center of the annular medium, means disposed relative to the medium for directing a beam of energy toward the medium to produce variations in the characteristics of the medium in accordance with variations in the characteristics of the beam, means operatively coupled to the last mentioned means for providing variations in the characteristics of the beam in representation of the information to be recorded, means operatively coupled to the medium for providing a movement of the medium relative to the beam of energy along a line having a radial component extending from the center of rotation of the annular medium to produce a spiral track of information on the annular medium, means operatively coupled to the annular medium for producing a control signal having characteristics variable in accordance with eccentricities in the rotation of the annular medium about the center of the annular medium, and means operatively coupled to the control signal means and responsive to the control signal for moving the beam of energy in a direction having a component along the spiral track and for providing such movement in accordance with variations in the characteristics of the contral signal to compensate for the eccentricities in the rotation of the annular medium about the center of the medium.

7. The combination of claim 6 wherein the annular medium includes a coating on its periphery and the means for producing the control signal includes a member in proximity to the coating on the periphery of the annular medium to provide a variable coupling betwen the member and the coating in accordance with the spacing between the member and the coating and wherein the control signal means is responsive to the variable coupling between the member and the coating to produce corresponding variations in the characteristics of the control signal.

8. The combination of claim 7 wherein the coating on the periphery of the annular medium and the member in proximity to the coating are conductive to define a capacitance having a value in accordance with the spacing between the conductive coating and the conductive member and wherein the control signal is provided with characteristics variable in accordance with variations in the value of the capacitance.

9. The combination of claim 7 wherein the coating on the periphery of the annular medium is magnetic and wherein the member in proximity to the magnetic coating is magnetic to define betwen the magnetic coating and the magnetic member a path having a reluctance variable in accordance with the spacing betwen the magnetic coating and the magnetic member and wherein the control signal is provided with characteristics variable in accordance with variations in the reluctance.

10. In combination in a system to provide variable characteristics representing information in a spiral track on an annular medium capable of varying its characteristics when subjected to a beam of energy, means operatively coupled to the medium for providing a rotational movement of the annular medium about the center of the annular medium, means disposed relative to the medium for directing a beam of energy toward the medium to produce variations in the characteristics of the medium in accordance with variations in the characteristics of the beam, means operatively coupled to the last mentioned means for providing variations in the characteristics of the beam in representation of the information to be recorded, means operatively coupled to the medium for providing a movement of the medium relative to the beam of energy along a line having a radial component extending from the center of rotation of the annular medium to produce a spiral track of information on the annular medium, means operatively coupled to the annular medium for producing a pair of control signals having characteristics variable in accordance with eccentricities in the rotation of the annular medium about the center of the annular medium at a pair of positions displaced from each other through a particular angle, means operatively coupled to the control signal means and responsive to a first one of the pair of control signals for varying the position of the beam along a line having a radial component extending from the center of rotation of the annular medium in accordance with variations in the characteristics of the first control signal, and means operatively coupled to the control signal means and responsive to the other of the pair of control signals for varying the position of the beam in a direction having a component along the spiral track in accordance with variations in the characteristics of the other control signal to compensate for eccentricities in the rotation of the annular medium about the center of the annular medium.

11. The combination in claim 10 wherein the annular medium includes a coating on its periphery and the means for producing the pair of control signals includes two members in proximity to the coating on the periphery of the annular medium and displaced from each other through the particular angle to provide a variable coupling between each of the two members and the coating in accordance with the spacing between the members and the coating and wherein the means for producing the pair of control signals are responsive to the variable coupling between each of the two members and the coating to produce corresponding variations in the characteristics of the pair of control signals.

12. In combination in a system for producing variable characteristics representing information in a spiral track on an annular medium capable of varying its characteristics when subjected to a beam of energy, first means operatively coupled to the medium for providing a rotational movement of the medium, second means disposed relative to the medium for directing a beam of energy toward the medium to produce variations in the characteristics of the medium in accordance with variations in the characteristics of the beam, third means operatively coupled to the second means for obtaining variations in the characteristics of the beam in representation of information to be recorded in the spiral track on the medium, fourth means operatively coupled to the medium for providing a movement of the medium relative to the beam of energy along a radial line extending from the center of rotation of the medium, fifth means operatively coupled to the first means and responsive to variations in the rotary movement of the medium for producing a control signal having characteristics representing such variations in the rotary movement, sixth means operatively coupled to the annular medium for producing a control signal having characteristics variable in accordance with eccentricities in the rotation of the annular medium about the center of rotation of the annular medium, and seventh means operatively coupled to the second means and responsive to the control signal produced by the fifth means and the control signal produced by the sixth means for varying the position of the beam along a line having a radial component extending from the center of rotation of the annular medium in accordance with variations in the characteristics of the control signals to compensate for variations in the rotary movement of the medium.

13. In combination in a system to produce variable characteristics in a spiral track on a medium capable of varying its characteristics when subjected to a beam of energy with the variable characteristics representing frames of information presented at a recurring rate, first means operatively coupled to the medium for rotating the medium at a speed corresponding to an integral number of frames of information in each revolution of the medium with each revolution thereof corresponding to an integral number of frames of information as presented at a recurring rate, second means disposed relative to the medium for directing a beam of energy toward the medium to produce variations in the characteristics of the medium in accordance with variations in the characteristics of the beam, third means operatively coupled to the second means for varying the characteristics of the beam in representation of the frames of information to be recorded in the spiral track on the medium, fourth means operatively coupled to the medium for providing a movement of the medium relative to the beam of energy along a line having a radial component extending from the center of rotation of the medium to produce a spiral track of information on the medium with each revolution of the medium representing an integral number of frames on the spiral track, and means for varying the position of the beam relative to the medium at each instant to compensate for any eccentricities in the rotation of the medium at each instant.

14. In combination in a system to produce variable chracteristics in a spiral track on a medium capable of varying its characteristics when subjected to a beam of energy with the variable characteristics representing frames of information presented at a recurring rate, first means operatively coupled to the medium for providing a rotational movement of the medium with each revolution thereof corresponding to an integral number of frames of information as presented at a recurring rate to obtain a disposition of a the variable characteristics for each particular position on the successive frames in adjacent relationship on the spiral track on the medium, second means operatively coupled to the first means and responsive to variations in the rotary movement of the medium for producing a control signal having characteristics representing such variations in the rotary movement, third means operatively coupled to the second means and responsive to the control signal for varying the rotational movement of the medium to compensate for the variations in the rotary movement of the medium, fourth means disposed relative to the medium for directing a beam of energy toward the medium to produce variations in the characteristics of the medium in accordance with variations in the characteristics of the beam, fifth means operatively coupled to the fourth means for varying the characteristics of the beam in representation of information to be recorded in the spiral track on the medium, and sixth means operatively coupled to the medium for providing a movement of the medium along a line having a radial component extending from the center of rotation of the medium to produce a spiral track of information on the medium with each revolution of the medium including an integral number of frames on the spiral track.

15. In combination in a system to produce variable characteristics in a spiral track on a medium capable of varying its characteristics when subjected to a beam of energy, with the variable characteristics representing frames of information presented at a recurring rate, first means operatively coupled to the medium for providing a rotational movement of the medium, second means operatively coupled to the first means and responsive to variations in the rotary movement of the medium for producing a control signal having characteristics representing such variations in the rotary movement, third means disposed relative to the medium for directing a beam of energy toward the medium to produce variations in the characteristics of the medium in accordance with variations in the characteristics of the beam, fourth means operatively coupled to the third means for varying the characteristics of the beam in representation of information to be recorded in the spiral track on the medium, and fifth means operatively coupled to the fourth means and responsive to the control signal for varying the rate at which the fourth means obtains variations in the characteristics of the beam to compensate for the variations in the rotary movement of the medium.

16. In combination in a system to produce variable characteristics in a spiral track on a medium capable of varying its characteristics when subjected to a beam of energy with the variable characteristics representing frames of information presented at a recurring rate, first means operatively coupled to the medium for providing a rotational movement of the medium with each revoltuion thereof corresponding to an integral number of frames of information as presented at a recurring rate to obtain a disposition of the variable characteristics for each particular position on the successive frames in adjacent relationship on the spiral track on the medium, second means disposed relative to the medium for directing a beam of energy toward the medium to produce variations in the characteristics of the medium in accordance with variations in the characteristics of the beam, third means operatively coupled to the second means for varying the characteristics of the beam in representation of the frames of information to be recorded in the spiral track on the medium, fourth means operatively coupled to the first means and responsive to variations in the rotary movement of the medium for producing a control signal having characteristics representing such variations in the rotary movement, fifth means operatively coupled to the third means and responsive to the control signal for varying the rate at which the third means obtains variations in the characteristics of the beam to compensate for the variations in the rotary movement of the medium, and sixth means operatively coupled to the medium for producing a movement of the medium along a line having a radial component extending from the center of rotation of the medium to produce a spiral track of information on the medium with each revolution of the medium including an integral number of frames on the spiral track.

17. In combination in a system to produce variable characteristics in a track on a medium capable of varying its characteristics when subjected to a beam of energy with the variable characteristics representing frames of information presented at a recurring rate, first means operatively coupled to the medium for providing a rotational movement of the medium at a speed corresponding to the recurring rate of the information to obtain a disposition of the variable characteristics for each particular position on the successive frames in adjacent relationship on the spiral track on the medium, second means disposed relative to the medium for directing a beam of energy toward the medium to produce variations in the characteristics of the medium in accordance with variations in the characteristics of the beam, third means operatively coupled to the second means for varying the characteristics of the beam in representation of the frames of information to be recorded on the track on the medium, fourth means operatively coupled to the first means and the third means and responsive to variations in the rotary movement of the medium for controlling the rate at which the third means obtains variations in the characteristics of the beam to compensate for the variations in the rotary movement of the medium, and fifth means operatively coupled to the first means and responsive to variations in the rotary movement of the medium for controlling the first means to compensate for the variations in the rotary movement of the medium.

References Cited

UNITED STATES PATENTS

| | | | |
|---|---|---|---|
| 2,422,398 | 6/1947 | Dilks | 179—100.3 |
| 3,159,711 | 12/1964 | Schut | 178—6.6 |

ROBERT L. GRIFFIN, *Acting Primary Examiner.*

ROBERT SEGAL, JOHN W. CALDWELL, *Examiners.*

H. W. BRITTON, *Assistant Examiner.*